United States Patent Office 3,545,040
Patented Dec. 8, 1970

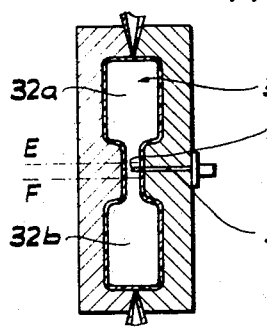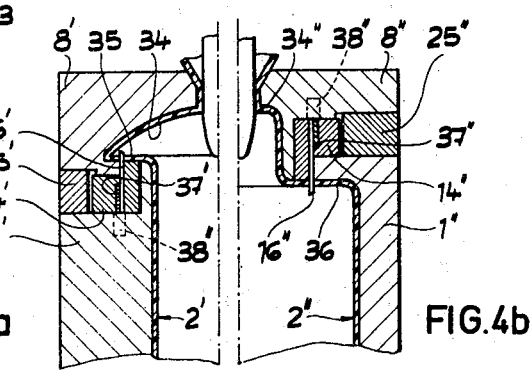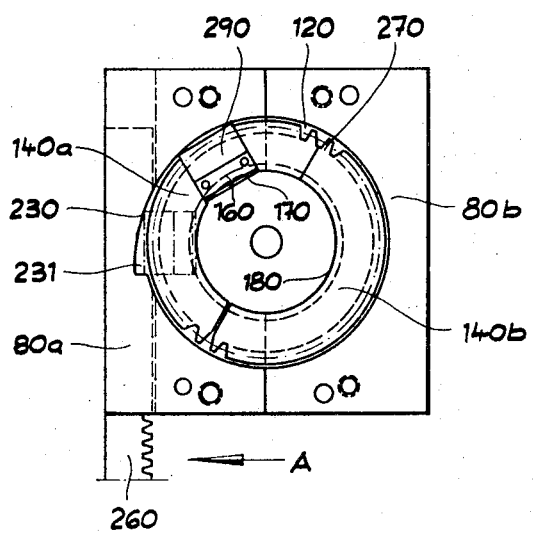

3,545,040
BLOW MOLDING APPARATUS
Horst Mehnert, Forddamm 91, Berlin 42, Germany
Filed Aug. 1, 1967, Ser. No. 657,574
Claims priority, application Germany, Aug. 17, 1966,
M 56,006
Int. Cl. B29d 23/03
U.S. Cl. 18—5                                           20 Claims

ABSTRACT OF THE DISCLOSURE

A cap-like or annular surplus portion can be separated from the main portion of a blow molded article in the cavity of the blow mold by one or more tools which are reciprocably received in channels provided in a preferably annular composite driving member surrounding a portion of the mold cavity and being turnable in an annular groove of the mold by a toothed rack, worm or the like. Each tool leaves a retracted position and penetrates into the material of the blow molded article in response to movement of the driving member from a starting position in which each of its arcuate portions is fully received in a separate section of the mold. Each tool can be installed to reciprocate radially or in parallelism with the axis of the driving member, depending upon whether its cutting edge is to sever a cylindrical or conical portion of the article (radial position of the tool) or a washer-like portion of the article (axially parallel position of the tool).

BACKGROUND OF THE INVENTION

The present invention relates to blow molding apparatus in general, and more particularly to improvements in apparatus wherein surplus material must be removed from articles which are obtained by expansion of plastic parisons in the cavity of a blow mold.

Presently known blow molding apparatus for conversion of continuously or intermittently extruded tubular or strip-shaped parisons into bottles, tubes or similar hollow plastic articles normally comprise a two-piece blow mold (also called open-and-shut mold) which defines a mold cavity adapted to receive a tubular parison or a parison consisting of one or more strips of plastic material and to support the parison prior to and during expansion which is carried out by means of air or another gas admitted by a blowing mandrel or an analogous gas-admitting device. In blow molding of certain types of hollow plastic articles, particularly bottles or containers having a large-diameter neck or inlet, it is necessary to remove the surplus from the finished article in order to provide an opening which is large enough for convenient admission or evacuation of flowable contents that are being stored in such article and whose diameter is larger than the diameter of the gas-admitting device. The surplus need not constitute a so-called flash or web which is the material that has penetrated into the clearances between the mold sections, i.e., such surplus may actually constitute a cap-like or annular wall portion of the finished article. For example, it happens frequently that a hollow container is formed in a blow molding apparatus in such a way that each of its ends is sealed. One end of the thus formed container is then provided with an inlet by removing a cap-like end portion of the container. This is in contrast to certain presently known blow molding methods according to which the blow molded article is provided with an opening which is calibrated by the blowing mandrel. Such methods are quite satisfactory when the diameter of the opening in the blow molded article, for example, the diameter of the opening in the neck of a plastic bottle, is in a certain satisfactory relationship to the maximum diameter of the main portion of the bottle. As a rule, the neck portion of a blow-molded bottle will be provided with an opening which is formed exclusively by the blowing mandrel if the diameter of such opening is relatively small, as compared to the maximum diameter of the bottle. If the parison is constituted by a tube, the external diameter of such tube is slightly larger than the diameter of that portion of the mold cavity which is to receive the neck of the bottle and the internal diameter of the tube is slightly smaller than the external diameter of the blowing mandrel. Thus, when the mandrel is caused to penetrate into the corresponding end of the tubular parison, it causes the parison to expand against the adjoining portion of the mold whereby the resulting neck or inlet portion of the blow molded article is properly calibrated from within and from without. The remainder of the tubular parison is then expanded by a stream of gas which is admitted through the mandrel so that it lies against the internal surface of the mold cavity and forms the major or body portion of the finished article. The wall thickness of the parison must be selected with a view to insure that the wall thickness of the finished article will be within a desired optimum range.

Serious problems arise in the manufacture of bottles or like containers wherein the diameter of the neck portion is only slightly less than the diameter of the main body portion. Such containers are often used for storage of instant coffee or the like. If a container with a relatively large open-ended neck is to be formed in accordance with the above described method of calibrating the neck by means of the blowing mandrel, the diameter of the parison must be very large so that the main portion of the finished container will undergo very little expansion with attendant waste in plastic material and excessive wall thickness of the main body portion. Insufficient expansion of parisons can bring about additional drawbacks, for example, unsatisfactory transparency or translucency of the finished product.

Manufacturers of blow molded articles normally resort to a well known procedure of calculating an average value for the diameter of the neck portion of the container and an average expansion (wall thickness) of the main portion of the container. Such calculating procedure suggests (a) the use of parisons whose external diameter is greater than the diameter of that portion of the mold cavity which receives the neck when the diameter of the neck is relatively small (for example, when a bottle has a maximum diameter of 50 millimeters and a neck with a diameter of 15 millimeters, the external diameter of the parison may be 17 or 18 millimeters so that one end of such parison is satisfactorily gripped by the mold during introduction of the blowing mandrel) or (b) the use of parisons whose external diameter is smaller than the diameter of that portion of the mold cavity which receives the neck when the diameter of the neck is relatively large (for example, if a container for powdered coffee or a tube for paste or the like is to have a maximum diameter of 55 mm. and a neck with a diameter of 30 mm. or more, the external diameter of the parison is normally 20–25 mm. so that the parison is not gripped by that portion of the closed blow mold which is to define a large-diameter neck). In other words, the parison is properly gripped only if its external diameter is slightly larger or is not smaller than the diameter of that portion of the mold cavity which is to receive the neck of a plastic bottle or the like, but the parison is not gripped at all if its external diameter is smaller than such portion of the mold. The problem of satisfactorily manipulating parisons which are not automatically gripped in response to closing of the blow mold is particularly acute when the parisons are extruded intermittently, i.e., when the expansion of parisons takes place subsequent to separation from the plastic material in the nozzle of the extrusion machine, a procedure which is quite customary in the production of relatively large blow molded articles.

The internal diameter of a parison which is calibrated by the blowing mandrel should be only slightly less than the diameter of the mandrel because, otherwise, the mandrel will be unable to penetrate into one end of the parison but will merely push the parison into the mold cavity. Attempts to overcome such difficulties include the provision of blow molds which are equipped with means for effecting expansion of the neck against the corresponding portion of the mold and of thereupon attracting the thus expanded neck to the mold sections, for example, by resorting to devices which blow gas into the parison to form a large-diameter neck and to devices which thereupon hold the expanded portion of the parison by suction. This insures that the partially expanded and suctionally retained parison remains in requisite position during transfer of a blow mold from the extruding station to the blowing station. Furthermore, the suctionally attracted portion of a parison offers requisite resistance to displacement in response to introduction of the blowing mandrel, i.e., the blowing mandrel can be used to effect accurate internal calibration of the neck. The just described molds are quite satisfactory but are considered too expensive, not only because they must be provided with auxiliary expanding and attracting devices but also because they must use very large blowing mandrels which cannot be moved at a high speed and require much energy for introduction into and withdrawal from the parisons. Therefore, manufacturers of blow molding apparatus resort to the just described solution solely in the event that the blow molded article must be provided with accurately dimensioned neck portions, i.e., with neck portions which must be properly calibrated from within and from without. However, the use of devices for preliminary expansion and attraction of parisons is uneconomical when the neck of a plastic article must be calibrated only from without, for example, in the manufacture of bottles or containers whose necks are provided with external threads to take internally threaded caps or in the manufacture of containers which are provided with necks having inwardly or outwardly extending annular flanges adapted to engage with complementary flanges of perforated caps or the like which need not be removed from the finished blow molded articles.

Internal calibration is unnecessary in the manufacture of plastic tubes whose open ends are sealed by repeated bending or in the production of containers which are provided with sieve-like caps for permitting controlled evacuation of granular or like material by spraying.

In accordance with a further proposal, the last mentioned types of blow molded articles are produced by blow molding a completely or almost entirely sealed hollow article and by thereupon removing a surplus portion of the resulting product by severing in a separate machine to remove the surplus and to thus provide the product with an inlet opening. The removed portion or surplus is often called a lost bottom or a lost head. In the manufacture of such articles, the blow mold is provided with a mandrel or with a needle whose diameter is considerably smaller than the diameter of the opening which is formed in response to removal of the lost portion. Containers for coffee are often provided with a foil of aluminum or the like which seals the opening to prevent escape of aromatic substances. Such containers must be formed with inwardly extending flanges which surround the openings and are sealingly connected with the marginal portions of the foils. In the manufacture of flanged containers, one cannot resort to the formation of openings by means of a blowing mandrel, i.e., it is necessary to actually remove a surplus portion of the finished article to provide a flange surrounding an opening for introduction and evacuation of the contents. The same holds true for the manufacture of tubes which are used for storage and dispensal of creams or like substances. Such tubes are formed by blowing and are thereupon removed from the mold to be introduced into a machine which removes the lost or surplus portion in order to form a relatively large opening which may or may not be surrounded by a flange. Finally, it is often desirable to form two or more blow molded articles in a simultaneous operation and to thereupon separate the finished articles from each other by cutting means. For example, two bottles can be molded in two mirror symmetrical halves of a mold cavity to be thereupon separated from each other by resorting to a knife or the like. Heretofore known apparatus for the production of two or more blow molded articles in a simultaneous operation are unsatisfactory, mainly because the separation of finished articles from each other cannot be carried out in the blow mold, i.e., the multiplex product must be removed from the mold cavity and transferred into a second machine for separation into two or more individual components. The same applies for removal of lost or surplus portions from blow molded articles which are produced individually. Additional time and work involved in the transfer of finished articles from the mold into a cutting machine contribute significantly to the cost of products and the machinery needed for removal of lost portions is another factor which has prevented widespread acceptance of such procedures in the manufacture of blow molded commodities. The transfer of articles from the mold to the cutting machine is often carried out by hand.

SUMMARY OF THE INVENTION

It is an important object of my invention to provide a novel and improved blow molding apparatus wherein a cap-like, annular or otherwise configurated surplus portion or lost portion of a freshly formed blow molded article can be separated from the remainder of the article in a time-saving and space-saving manner without necessitating evacuation of the article from the cavity of the mold.

Another object of the invention is to provide an apparatus of the just outlined character wherein blow molded articles can be relieved of surplus in such a way that the openings left upon removal of such surplus can be surrounded by inwardly or outwardly extending flanges and/ or by chamfered surfaces.

A further object of the invention is to provide an apparatus which, in addition to removing surplus from a freshly blown hollow plastic article, can simultaneously separate such article into a plurality of finished containers or the like.

An additional object of the instant invention is to provide a novel, rugged and compact severing device which can be used in the blow molding appartus to remove surplus from and/or to subdivide freshly blown articles into two or more components without necessitating removal of such articles from the mold cavity and regardless of whether the articles are formed by expansion of tubular or strip-shaped parisons by means of mandrels, needles or other gas-admitting devices.

A further object of the invention is to provide a severing device which can be installed in presenly known blow molding apparatus.

A concomitant object of the invention is to provide a novel mold which can be used in an apparatus of the above outlined character.

Still another object of the invention is to provide a novel driving or advancing unit for the aforementioned severing device.

Briefly outlined, one feature of my invention resides in the provision of a combination which is embodied in a blow molding apparatus and includes a composite mold having two or more sections movable from open to closed positions to define a cavity wherein a prison may be expanded by compressed gas to form a hollow article having a main portion (for example the body and the neck of a bottle) and a surplus portion or lost portion (for example, a cap-like head or bottom), severing means provided in the mold for effecting at least partial separation of the surplus portion from the main portion of the article, and advancing or driving means for moving the severing means relative to the mold when the sections are held in closed position whereby the severing means separates the surplus portion from the main portion.

In accordance with a more specific feature of my invention, each of the mold sections is preferably provided with at least one arcuate groove and such grooves together form a circumferentially complete annular groove when the mold is closed whereby the annular groove surrounds the cavity. The advancing or driving means comprises a composite annular driving member in the form of a pinion or worm wheel which is turnable in the annular groove and means (for example, a toothed rack or a worm wheel) for turning the driving member in its groove while the mold is closed. The severing means may comprise one or more cutting or severing tools each received in a channel provided therefor in the driving member and movable either radially or in parallelism with the axis of the driving member between a retracted position and an extended or operative position in which its cutting edge pierces the material of the blow molded article in the region between the main portion and the surplus portion. The tool is compelled to turn with the driving member so that it forms an arcuate or a circumferentially complete cut in the blow molded article.

The novel features which are considered as characteristic of the invention are set forth in particular in the appended claims. The improved blow molding apparatus itself, however, both as to its construction and its mode of operation, together with additional features and advantages thereof, will be best understood upon perusal of the following detailed description of certain specific embodiments with reference to the accompanying drawing.

BRIEF DESCRIPTION OF THE DRAWING

FIG. 3 is a diagrammatic vertical sectional view of an open-and-shut mold in a second blow molding apparatus;

FIG. 4a is a fragmentary vertical sectional view of a third blow molding apparatus; and FIG. 4b is a similar view of a fourth blow molding apparatus;

FIG. 5 is a similar view as shown in FIG. 2 of a further embodiment of a blow molding apparatus.

DESCRIPTION OF THE PREFERRED EMBODIMENTS

Figure 1:
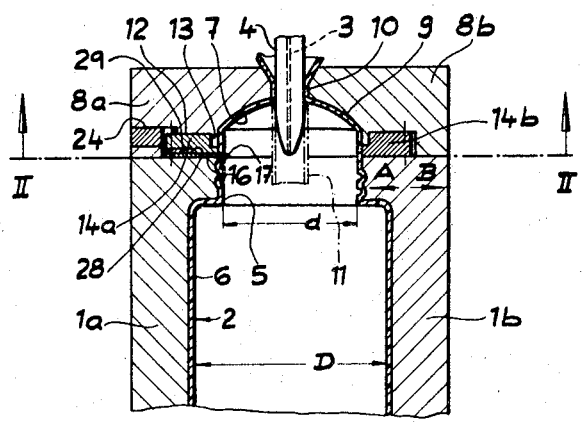
FIG. 1 is a fragmentary vertical sectional view of a blow molding apparatus which embodies one form of my invention, the section being taken along the line I—I of FIG. 2.
Figure 2:
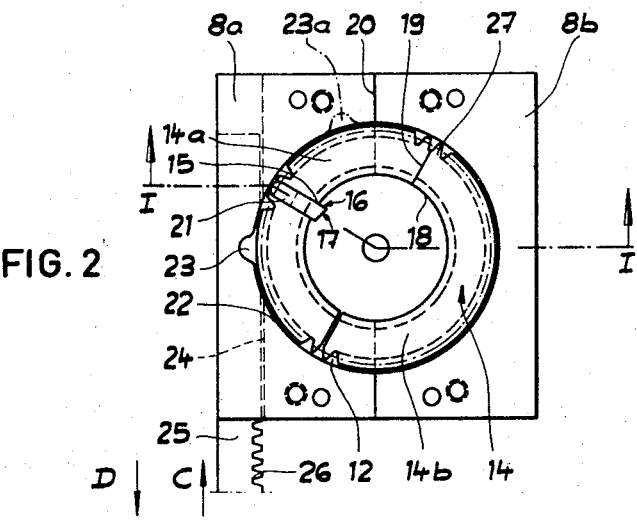
FIG. 2 is a view as seen in the direction of arrows from the line II—II of FIG. 1.

Referring first to FIGS. 1 and 2, there is shown a portion of a blow molding apparatus which is used in the production of bottles or like containers 2 having necks 5 with a relatively large diameter $d$ as compared with the maximum diameter $D$ of the main part 6 of the container. The apparatus comprises a mold having sections 1a, 1b and a blowing mandrel 4 whose axial bore 3 admits a stream of gas which is used to expand a tubular or strip-shaped parison 11 (indicated by phantom lines) in order to convert the parison into the container 2. The lost portion or surplus portion of the container 2 resembles a cap and is shown at 7; this surplus portion of the container can be removed in accordance with a first embodiment of my invention. It will be noted that the diameter of the mandrel 4 is but a small fraction of the diameter $d$, i.e., that the mandrel is not used to calibrate the neck 5 but serves solely as a means for admitting compressed air or another suitable gas to effect expansion of parisons 11. The sections 1a, 1b of the mold may but need not be provided with means for attracting the parison by suction prior to and during introduction of the mandrel 4 into the upper end of the parison.

The upper portions of the mold sections 1a, 1b respectively carry detachable parison clamping extensions or jaws 8a, 8b which can be separated from the corresponding mold sections in the plane indicated by the line II—II. The plane indicated by this line II—II is the plane in which the lost portion 7 is to be separated from the neck 5 to provide the latter with a relatively large opening for admission or evacuation of flowable material. When the mold is closed, the jaws 8a, 8b define between themselves that part 9 of the mold cavity which accommodates the lost portion 7. In addition, the jaws 8a, 8b then define a cylindrical passage 10 for admission of the blowing mandrel 4. The passage 10 also receives the upper end of the parison 11. The jaws 8a, 8b are further provided with semicircular grooves which together form an annular internal groove 12 when the mold is closed, i.e., when the mold sections 1a, 1b and their jaws 8a, 8b respectively abut against each other in a plane indicated by the line 20 and extending at right angles to the plane of FIG. 1 or 2. The grooves of the jaws 8a, 8b may be formed by resorting to a suitable turning tool, not shown. The groove 12 is separated from the part 9 of the mold cavity by an annular bead or rib 13 which consists of two halves, each integral with one of the jaws 8a, 8b. The groove 12 accommodates a first driving member 14 of a driving or advancing unit for a severing or cutting tool 16. The driving member 14 constitutes a two-piece ring gear or pinion which can rotate in the groove 12 around the bead 13 to move the tool 16 about the vertical axis of the part 9 and to thus separate the surplus portion 7 from the neck 5. As a rule, the number of arcuate portions which form the pinion 14 will equal the number of mold sections or jaws. In the illustrated embodiment, the pinion 14 comprises two semicircular portions 14a, 14b which are obtained by sawing an originally annular one-piece pinion into two mirror symmetrical halves. The portions 14a, 14b are loosely inserted into the groove 12 and need not be connected to each other. In order to cause the pinion 14 to turn about the axis of the part 9 of the mold cavity, at least one of the portions 14a, 14b is driven, either directly or indirectly, by another member of the driving or advancing unit whereby one end face 19 of the driven portion 14a or 14b transmits motion to the other portion.

The tool 16 is inserted into a radially or nearly radially extending channel 15 which is machined into the lower side face of the semicircular pinion portion 14a. The plane of the channel 15 is closely adjacent to the plane indicated by the line II—II. The arrows A and B indicate in FIG. 1 the directions in which the tool 16 can move in the channel 15 substantially radially of the part 9; this tool is provided with a cutting edge 17 which is preferably constituted by the crest of a wedge-shaped inner end portion of the tool. When the latter is in operative position with reference to the portion 14a, its edge 17 extends inwardly beyond the internal surface 18 of the pinion 14 so that it penetrates into the material of the blow molded container 2 and separates the surplus portion 7 from the neck 5 in response to turning of the pinion 14. However, when the pinion 14 is held in an initial or starting position in which its arcuate portions 14a, 14b are respectively concealed in the jaws 8a, 8b, the rounded outer end 21 of the tool 16 may extend into a recess 23 provided in the jaw 8a so that the cutting edge 17 can be retracted or pushed back radially outwardly beyond the internal surface 18 of the pinion 14. FIG. 2 shows that the end faces 19 of the pinion portions 14a, 14b are not in registry with the plane 20, i.e., that the tool 16 is not in registry with the recess 23 whereby the cutting edge 17 extends inwardly beyond the internal surface 18. When the rounded outer end 21 abuts against a cylindrical cam surface 22 which surrounds the groove 12, the cutting edge 17 extends inwardly beyond the internal surface 18 of the pinion 14 and the tool 16 is in cutting or severing position.

The aforementioned driving or advancing unit for the tool 16 further comprises a second driving member here shown as a reciprocable rack 25 which extends into a cutout 24 machined into the lower side face of the jaw 8a tangentially of the groove 12. The teeth 26 of the rack 25 mesh with the teeth 27 of the semicircular portion 14a or 14b, depending on the angular position of the pinion 14. The arrows C and D indicate in FIG. 2 the directions in which the rack 25 is reciprocable by a suitable prime mover, for example, by the piston rod of a double-acting or single-acting hydraulic or pneumatic cylinder and piston unit or by the armature of an electromagnet, not shown. The tool 16 shares all angular movements of the pinion 14 in response to reciprocation of the rack 25.

The prime mover for the rack 25 is preferably adjusted in such a way that the pinion 14 completes one full turn in a clockwise direction and one full turn in a counter- clockwise direction when the mold is closed. Before the pinion 14 begins to turn, the outer end 21 of the tool 16 extends into the recess 23 so that the cutting edge 17 is located outwardly of the internal surface 18 of the pinion. This cutting edge 17 penetrates into the material of the container 2 when the pinion 14 begins to turn because the outer end 21 is compelled to track the cam surface 22 of the jaw 8a and thereupon the corresponding cam surface of the jaw 8b. The cutting edge 17 pierces the material of the container and forms a clean cut to form an opening in the top of the neck 5. The rack 25 or another component of the driving unit for the tool 16 preferably actuates a limit switch which prevents opening of the mold before the rack 25 returns to the starting position in which the outer end 21 of the tool 16 registers with the recess 23 in the jaw 8a and in which the end faces 19 of the arcuate portions 14a, 15 lie in the plane 20. Such limit switch (not shown in the drawing) prevents eventual damage to the pinion 14 and/or to the blow molded article.

The severing of the container 2 takes place during a predetermined stage of a blow molding cycle. For example, and if the entire cycle requires 7 seconds, the actual blowing stage (admission of compressed gas through the bore 3 of the mandrel 4) will require 4 seconds, and such blowing stage is followed by a dwell of 1.5 seconds during which the tool 16 separates the surplus portion 7 from the neck 5. The dwell is followed by an ejection stage which requires 1.5 seconds. The rack 25 is started upon completion of the blowing stage and completes a full forward stroke and a full return stroke to turn the pinion 14 twice through 360 degrees, first in a clockwise direction (as viewed in FIG. 2) and thereupon in a counterclockwise direction.

Since the tool 16 is loosely inserted into the channel 15 of the arcuate portion 14a, its cutting edge 17 extends inwardly beyond the internal surface 18 of the pinion 14 when the severing stage is completed. The tool then remains in such position during ejection of the container 2 and segregated surplus portion 7 but is pushed back into the recess 23 by the adjoining portion of a fresh parison 11 in response to renewed closing of the mold. More particularly, the cutting edge 17 will be pushed radially outwardly in response to expansion of the parison 11 by compressed air which is admitted into the parison during a fresh blowing stage. The tool 16 then moves in the direction of the arrow A.

The apparatus of FIGS. 1 and 2 further comprises arresting means serving to prevent excessive movements of the tool 16 into the part 9 of the mold cavity. Such arresting means comprises a shoulder at the inner end of the channel 15 in the arcuate portion 14a and a shoulder 28 provided on the tool 16 and engaging the shoulder in the channel 15 when the tool assumes its innermost position, i.e., when the outer end 21 of the tool tracks the cam surface 22. The shoulder 28 may be provided on a tool holder 29 which is welded or otherwise secured to the tool 16.

It is clear that the driving or advancing unit for the tool 16 may be modified in a number of ways without departing from the spirit of the present invention. For example, the members, 14, 24 may be replaced by a cable line which unwinds itself against the opposition of a torsion spring or the like in a manner known from the art of cable collecting devices. It is also possible to utilize a worm drive which is often preferred to the rack and pinion drive of FIGS. 1 and 2 because it occupies less room. Theh driving members 14, 24 are then respectively replaced by a worm wheel and a worm. The worm will take up less room than the rack 25 because it need not move axially but merely rotates to drive the worm wheel in a clockwise or in a counterclockwise direction. It is further clear that the pinion 14 can carry two or more tools which may be located in two or more axially spaced planes and may travel in circular paths having different diameters. Moreover, the apparatus of FIGS. 1 and 2 may utilize a plurality of tools to sever the surplus portion 7 from the neck 5 of a freshly produced container 2. Thus, each of the arcuate portions 14a, 14b may be provided with a channel 15 for a separate tool 16 so that it will suffice to turn the pinion 14 through a little more than 180 degrees in order to sever the surplus portion 7 from the remainder of the container provided, of course, that the two tools are mounted substantially diametrically opposite each other. The phantom-line recess 23a in FIG. 2 will be provided in the jaw 8a if the apparatus comprises two coplanar tools 16. The tool which is actually shown in FIG. 2 is then rotated clockwise through a little more than 180 degrees and anticlockwise through the difference between the angular displacement in clockwise direction and 180 degrees to place its outer end 21 into registry with the recess 23a. The other jaw 8b is then provided with a similar recess to receive the outer end of the second tool. The recess 23a is shown close to the plane 20.

If the apparatus of my invention comprises several axially spaced tools, it can be used to remove an annular, conical, or cylindrical surplus portion or lost portion from a multiplex container, for example, from a twin bottle 30 shown in FIG. 3. The planes of the two tools are indicated by the phantom lines E and F, and the numeral 33 denotes a gas admitting needle whose tip penetrates the parison between the planes E and F so that the tools will remove that cylindrical surplus portion 31 of the blow molded article 30 which has been punctured by the tip. For example, the plane F can accommodate the tool 16 of FIGS. 1 and 2, and the plane E then accommodates a tool which is inserted into a channel machined into the upper side face of the arcuate portion 14a, as viewed in FIG. 1. Once the cylindrical surplus portion 31 is removed from the blow molded article 30, the latter yields two containers 32a, 32b which are ejected from the mold cavity in response to opening of the mold. The needle 33 is preferably fixedly mounted in one section of the mold and is used as a substitute for an axially movable blowing mandrel.

The apparatus of my invention can be used with equal advantage to form in blow molded articles cuts which are located in a plane that is not exactly normal to the plane 20 in which the mold sections abut against each other. With reference to FIGS. 1 and 2, the jaws 8a, 8b, the pinion 14 and the tool 16 can be modified to form the neck 5 with an open top which is not located in the plane II—II. This can be achieved by reducing the height of that portion of the pinion 14 which is located directly below the beads 13 of the jaws 8a, 8b and by using a tool 16 of somewhat greater length. If the material of the container 2 is not overly brittle, the tool can readily form an elliptical cut. In such apparatus, the length of that portion of the tool 16 which extends beyond the internal surface 18 of the pinion 14 must be properly related to the longer axis of the ellipse.

It is further clear that the apparatus of my invention can be used with equal advantage to separate lost bottoms from certain other types of hollow blow molded articles. For example, the apparatus of FIGS. 1–2 or the apparatus of FIG. 3 may be used to form openings in hollow articles which are used as tubes for paste, cream or like substances. Moreover, and referring again to FIGS. 1 and 2, the groove 12 for the pinion 14 can be machined directly into the mold sections 1a, 1b, or the jaws 8a, 8b may form integral parts of the respective mold sections. For example, the groove 12 may be machined into the top faces of the mold sections 1a, 1b and the tool 16 is then installed in a channel 15 provided in the top face of the arcuate portion 14a or 14b.

FIG. 4a illustrates a further embodiment of my invention which can be utilized to provide one end of a blow molded article 2' with a radially outwardly extending washer-like flange 35. The drawing shows a multi-section mold 1', a multi-section jaw assembly 8', a composite annular driving member or pinion 14' driven by a second driving member or rack 25', and a tool 16' which is movable up and down in parallelism with the axis of the pinion so as to penetrate into a radially outwardly extending washer-like portion of the article 2' and to sever therefrom a surplus portion 34. The tool 16' is reciprocable in a vertical channel 37 of the pinion 14' and its lower end (corresponding to the outer end 21 of the tool 16) can slide along a suitable cam surface of the mold 1'. The latter is provided with a recess 38 (corresponding to the recess 23) to receive the lower end of the tool 16' when the latter's cutting edge should not penetrate into the material of the blow molded article 2'. The apparatus of FIG. 4a is also provided with an arresting device which limits upward movement of the tool 16', and such device again comprises a shoulder on the tool 16' and a complementary shoulder in the channel 37 of the pinion 14'. The channel 37 and the recess 38 may be machined into the mold by resorting to a suitable milling tool.

FIG. 4b illustrates a further blow molding apparatus which is analogous to the apparatus of FIG. 4a. The tool 16'' is reciprocable in a vertical channel 37'' of the pinion 14'' and in a registering slot of the mold 1'' to sever the surplus portion 34'' from a radially inwardly extending flange 36 of the blow molded article 2''. The jaw assembly 8'' has a recess 38'' which receives the upper end of the tool 16'' when the latter's cutting edge should not penetrate into the material of the article 2''. The numeral 25'' denotes a rack which can turn the pinion 14''.

The apparatus of FIG. 4a or 4b can be equipped with a tool which is inclined with reference to the vertical axis of the mold cavity to provide the flange 35 or 36 with a chamfered edge face.

The embodiment according to FIG. 5 is distinguished over that according to FIGS. 1 and 2 by the fact that a cutting tool 160 with a longer cutting edge is applied which is mounted on a tool holder 290. In the cutting or severing position shown, only the central part of its cutting edge extends 1 to 2 mm. beyond the internal surface of that part of the mold cavity, which is formed by the jaws 80a, 80b. The cutting tool is to be brought into the cutting position from the starting position (indicated by phantom lines) with the aid of a curve 230 continuously diminishing into the diameter of the groove 120 by turning the portions 140a, 140b. Thus contrary to the embodiment according to FIGS. 1 and 2 a cutting in the sense of a "drawing cut" and not a more or less abrupt pricking takes place. In the branch 231 of the curve 230 rests the external part of the tool holder 290, where the cutting tool before the beginning of the severing operation is to be pushed radially outward in response to expansion of the parison as described in connection with FIGS. 1 and 2.

The advantage of the blow mold according to FIG. 5 is to be seen in the fact that a pricking mark will not be applied on the container.

The apparatus of my invention can be produced at reasonable cost because the driving or advancing unit for the tool or tools can be mass-produced in available machinery. For example, the pinion 14, 14' or 14'' can be formed as a complete annulus and is thereupon subdivided in a sawing or like machine to form two or more arcuate portions each of which can be received in a section of the mold or in one of the jaws. All of the recesses, channels and/or grooves can be formed by milling or turning and need not be finished with a high degree of precision, i.e., the pinion can have a certain amount of freedom of movement in its annular groove, and the same holds true for the channel which receives the tool and/or for the cutout which receives the rack. Also, the individual arcuate portions of the pinion 14, 14' or 14'' need not be in permanent abutment with each other; for example, and referring to FIG. 2, one pair of adjoining edge faces 19 on the arcuate portions 14a, 14b can be separated from each other by a gap having a width of 0.5–1 mm. or even more without in any way affecting the operation of the tool 16. This gap is clearly shown in the lower part of FIG. 2.

Without further analysis, the foregoing will so fully reveal the gist of the present invention that others can, by applying current knowledge, readily adapt it for various applications without omitting features which fairly constitute essential characteristics of the generic and specific aspects of my contribution to the art.

What is claimed as new and desired to be protected by Letters Patent is set forth in the appended claims:

1. In a molding apparatus, a combination comprising a composite mold having sections movable from open to closed positions to define a cavity for a parison which can be expanded therein to form a hollow article having a main portion and a surplus portion, each of said mold sections having at least one groove and said grooves together forming at least one annular groove which surrounds said cavity in closed positions of said sections; advancing means comprising a composite annular driving member movable in said groove and comprising a plurality of portions, one for each of said sections, at least one portion of said driving member being provided with a channel; and a severing tool movable received in said channel, said advancing means further comprising means for moving said tool relative to said driving member to cause penetration of the tool into the article in said cavity and for moving said driving member circumferentially of said groove so that said tool severs the article to thereby effect at least partial separation of the surplus portion from the main portion.

2. A combination as defined in claim 1, wherein said driving member comprises a plurality of discrete arcuate portions and said channel extends substantially radially of said driving member.

3. A combination as defined in claim 2, wherein said one arcuate portion has two side faces and said channel is provided in one of said side faces.

4. A combination as defined in claim 1, wherein said driving member has gear teeth and said means for moving said driving member comprises a second toothed driving member meshing with the first mentioned driving member.

5. A combination as defined in claim 1, wherein said channel extends in substantial parallelism with the axis of said driving member.

6. A combination as defined in claim 1, wherein said driving member comprises a plurality of arcuate portions and wherein each of said arcuate portions is provided with at least one channel for a tool.

7. A combination as defined in claim 6, wherein said channels are disposed in a common plane.

8. A combination as defined in claim 6, wherein said channels are disposed in different planes.

9. A combination as defined in claim 1, wherein said driving member constitutes a pinion and the means for moving said pinion comprises a reciprocable rack, said rack extending into a cutout provided therefor in one of said sections and said cutout being substantially tangential to said annular groove.

10. A combination as defined in claim 1, wherein said driving member constitutes a worm wheel and the means for moving said driving member comprises a worm meshing with said worm wheel.

11. A combination as defined in claim 1, wherein said driving member is movable to and from a starting position and wherein one of said sections is provided with a recess registering with said channel to receive a portion of said tool in the starting position of said driving member.

12. A combination as defined in claim 11, wherein said tool has a cutting edge remote from said portion thereof, said cutting edge being disengaged from the article in said cavity when said portion of the tool extends into said recess.

13. A combination as defined in claim 1, further comprising arresting means for limiting the penetration of said tool into the mold cavity.

14. A combination as defined in claim 13, wherein said arresting means comprises cooperating shoulders provided on said tool and said driving member.

15. A combination as defined in claim 1, wherein each of said sections comprises a jaw and wherein said jaws define that portion of said cavity which accommodates said surplus portion of the article, said grooves being provided in said jaws.

16. A combination as defined in claim 15, wherein each of said jaws is separable from the remainder of the respective section and wherein each of said jaws has a bottom face which is provided with the respective groove.

17. A combination as defined in claim 1, wherein said mold comprises two sections and wherein said driving member is movable in a substantially circular path, said channel extending in one of two directions including a direction substantially radially and a direction in substantial parallelism with the axis of said circular path.

18. A combination as defined in claim 1, wherein said mold comprises two sections and said tool comprises a cutting edge including a central portion which extends into said cavity upon penetration of the tool into an article in said cavity, said driving member surrounding a portion of said cavity and being movable in said groove about such portion of the cavity in a substantially circular path, said channel extending in one of two directions including a direction substantially radially and a direction in substantial parallelism with the axis of said circular path.

19. A combination as defined in claim 1, wherein the means for moving said tool relative to said driving member is rigid with said method.

20. A combination as defined in claim 19, wherein said means for moving the tool relative to said driving member is an internal surface of said mold.

References Cited
UNITED STATES PATENTS

| | | | |
|---|---|---|---|
| 3,003,187 | 10/1961 | Schaich | 18—5X |
| 3,025,562 | 3/1962 | Nelson | 18—5 |
| 3,217,072 | 11/1965 | Schaich | 18—5X |
| 2,984,865 | 5/1961 | Mumford | 18—5X |
| 3,031,718 | 5/1962 | Adams | 18—5X |
| 3,430,290 | 3/1969 | Kinslow | 18—5 |
| 3,456,290 | 7/1969 | Ruekberg | 18—5 |
| 3,457,590 | 7/1969 | Dittmann | 18—5 |

J. SPENCER OVERHOLSER, Primary Examiner

M. O. SUTTON, Assistant Examiner

U.S. Cl. X.R.

83—913